(12) United States Patent  (10) Patent No.: US 8,023,015 B2
Chung et al.  (45) Date of Patent: Sep. 20, 2011

(54) SYSTEM, METHOD AND MEDIUM CORRECTING BRIGHTNESS OF AN IMAGE

(75) Inventors: Daesu Chung, Seoul (KR); Won-hee Choe, Gyeongju-si (KR); Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 600 days.

(21) Appl. No.: 11/898,494

(22) Filed: Sep. 12, 2007

(65) Prior Publication Data

US 2008/0074517 A1   Mar. 27, 2008

(30) Foreign Application Priority Data

Sep. 21, 2006 (KR) .................. 10-2006-0092010

(51) Int. Cl.
*H04N 5/20* (2006.01)
(52) U.S. Cl. ........................................ 348/255
(58) Field of Classification Search .................. 348/255, 348/229.1
See application file for complete search history.

(56) References Cited

U.S. PATENT DOCUMENTS

| 7,262,798 | B2 * | 8/2007 | Stavely et al. | 348/255 |
| 7,355,635 | B2 * | 4/2008 | Hoshuyama | 348/222.1 |
| 7,362,358 | B2 * | 4/2008 | Nakayama | 348/229.1 |
| 7,463,296 | B2 * | 12/2008 | Sun et al. | 348/254 |
| 7,508,421 | B2 * | 3/2009 | Tamaru et al. | 348/229.1 |
| 2004/0150738 | A1 * | 8/2004 | Sakimoto et al. | 348/333.11 |
| 2005/0219391 | A1 | 10/2005 | Sun et al. | |
| 2006/0082660 | A1 * | 4/2006 | Tsuda | 348/222.1 |

FOREIGN PATENT DOCUMENTS

| JP | 2003-125285 | 4/2003 |
| JP | 2004-282282 | 10/2004 |
| KR | 10-2004-0022348 | 3/2004 |

* cited by examiner

*Primary Examiner* — Lin Ye
*Assistant Examiner* — Amy Hsu
(74) *Attorney, Agent, or Firm* — Staas & Halsey LLP

(57) ABSTRACT

A system, method and medium correcting brightness of an image, and more particularly, a system, method and medium correcting brightness of an acquired image to achieve a target brightness. The system includes an initial brightness sensing unit to sense an initial brightness of the image from an initial exposure, and an image correction unit to correct the brightness of the sensed initial image toward a target brightness using predetermined brightness information corresponding to a sensed brightness environment of the image.

15 Claims, 9 Drawing Sheets

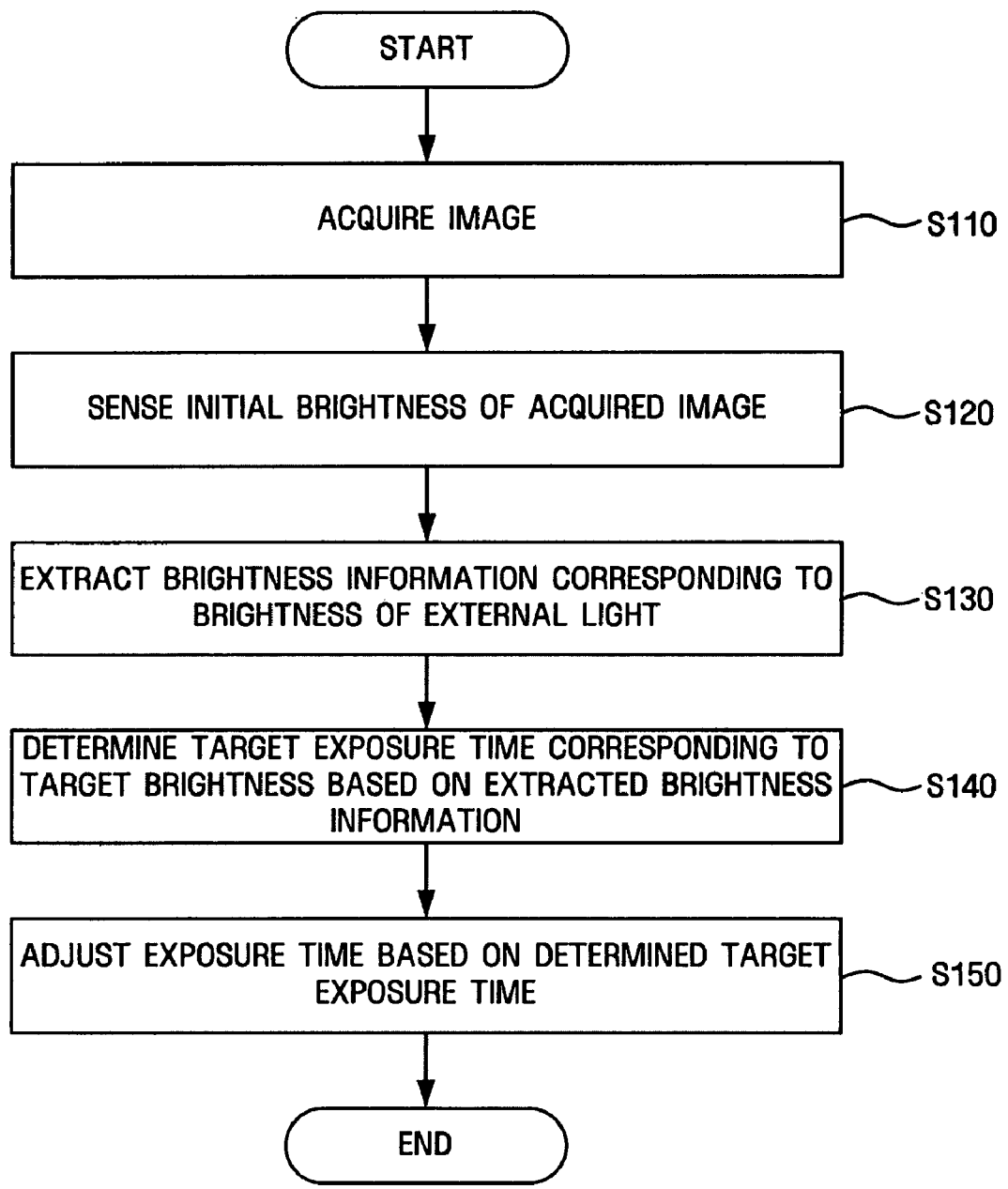

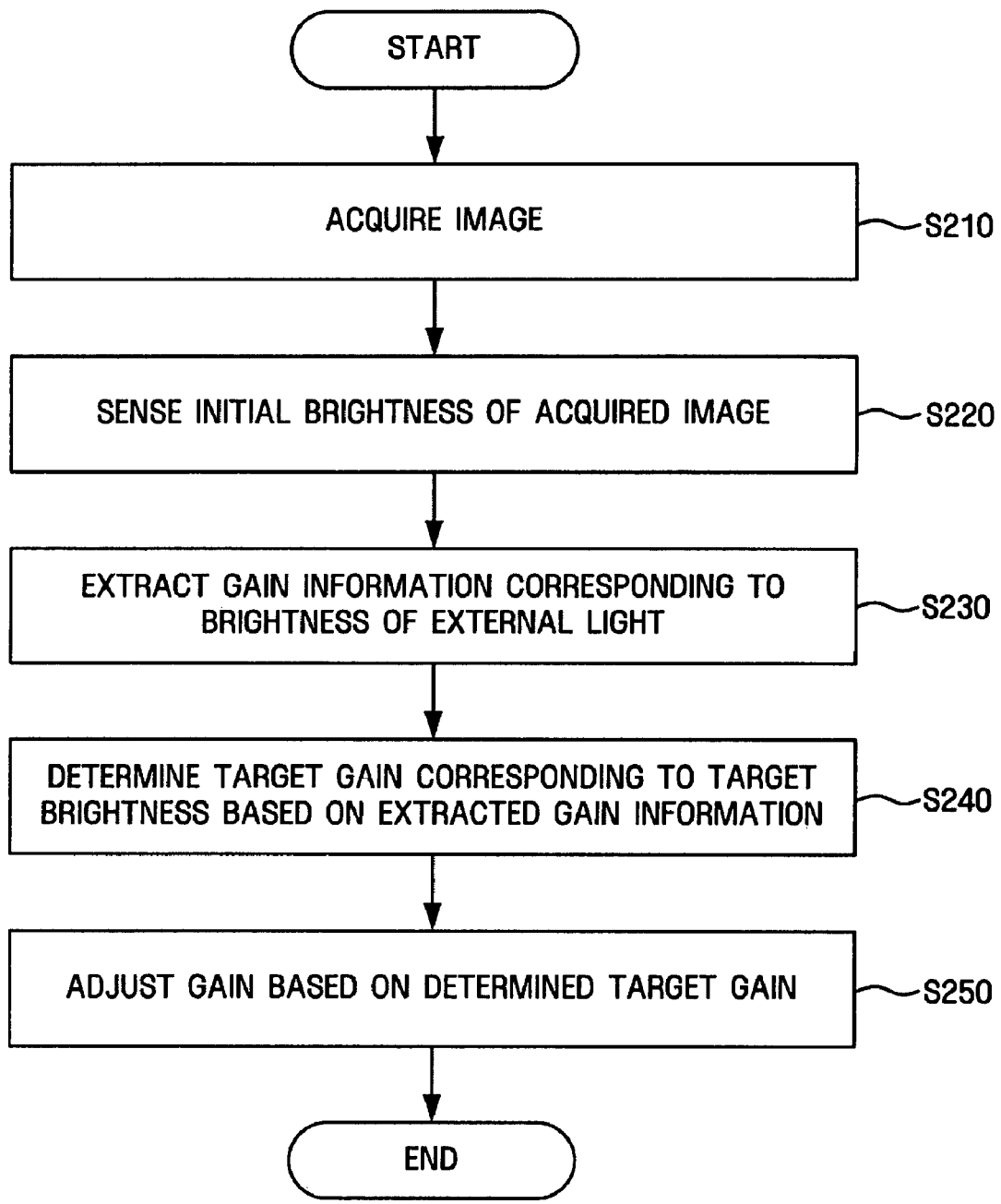

SYSTEM, METHOD AND MEDIUM CORRECTING BRIGHTNESS OF AN IMAGE

CROSS-REFERENCE TO RELATED APPLICATIONS

This application claims priority from Korean Patent Application No. 10-2006-0092010 filed on Sep. 21, 2006 in the Korean Intellectual Property Office, the disclosure of which is incorporated herein by reference in its entirety.

BACKGROUND

1. Field

One or more embodiments of the present invention relate to a system, method and medium correcting brightness of an image, and more particularly, to a system, method and medium correcting brightness of an image and capable of correcting brightness of an acquired image to a target brightness.

2. Description of the Related Art

In order to correct brightness of an image acquired by an image acquisition apparatus such as a camera or a camcorder, the difference between a current brightness of the acquired image and a target brightness of the acquired image is generally treated as an error. If the error exceeds a predetermined level, an exposure time and a gain are adjusted so that the current brightness of the acquired image can be adjusted to approach the target brightness.

In this case, the image acquisition apparatus performs a feedback loop in which the brightness of the acquired image is repeatedly corrected through the adjustment of the exposure time and gain until the error continuously caused by the difference between corrected brightness of the acquired image and the target brightness comes within the predetermined level.

When the brightness of the acquired image is repeatedly corrected until it becomes the target brightness, a correction value, used in the repeated corrections, may be set high so that the brightness of the acquired image reach the target brightness in a short period of time. However, with such large correction values, there is a risk that the corrected brightness of the acquired image will overshoot the target brightness, thereby causing oscillation. Consequently, system stability can be undermined. On the other hand, if the correction value is set too low for system stability, a time-consuming feedback loop becomes necessary.

Therefore, as determined by the present inventors, a method of correcting the current brightness of an image to a target brightness in a short period of time without causing oscillation is desirable.

Japanese Patent Publication No. 2003-125285 discusses a technique of storing information regarding the relationship between an exposure time of a camera and the brightness of an image in a database (DB) and referring to the stored information when necessary. Thus, this technique avoids the cycle of feedback control and its time-consuming control process. However, not all information regarding all possible relationships between the exposure time of the camera and the brightness of the image can be stored in the DB due to the huge quantity of necessary relationships. In addition, after data of a certain point is stored in the DB, the remaining points whose data is not stored must be inferred, e.g., through data interpolation. In addition, here, the relationship between the exposure time of the camera and the brightness of the image also varies according to the model of camera. Hence, the relationship is limited to a particular camera and does not have generality and flexibility. As a result, a separate DB must be implemented for each camera model.

SUMMARY

One or more embodiments of the present invention provide a system, method and medium correcting brightness of an image, the system, method and medium being capable of setting a device independent model of image brightness according to an exposure time and a gain and correcting brightness of an acquired image based on the set model, thereby reducing the time and amount of computation required to correct the brightness of the acquired image.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a system correcting brightness of an image of a subject. The system includes an initial brightness sensing unit to sense an initial brightness of the image from an initial exposure, and an image correction unit to correct the brightness of the sensed initial image toward a target brightness using predetermined brightness information corresponding to a sensed brightness environment of the image.

To achieve at least the above and/or other aspects and advantages, embodiments of the present invention include a method correcting brightness of an image of a subject. The method includes sensing an initial brightness of the image acquired from an initial exposure, and correcting the brightness of the sensed initial image toward a target brightness using predetermined brightness information corresponding to a sensed brightness environment of the image.

To achieve at least the above and/or other aspects and advantages, embodiments of the present invention include a method correcting brightness of an image of a subject. The method includes sensing an environmental brightness corresponding to the image, and correcting an initial brightness of the image obtained from an initial exposure using predetermined brightness information of the image corresponding to the sensed environmental brightness.

BRIEF DESCRIPTION OF THE DRAWINGS

These and/or other aspects and advantages of the invention will become apparent and more readily appreciated from the following description of embodiments, taken in conjunction with the accompanying drawings of which:

FIG. 8 illustrates a method of correcting brightness of an image according to an embodiment of the present invention; and FIG. 9 illustrates a method of correcting brightness of an image, according to an embodiment of the present invention.

DETAILED DESCRIPTION OF EMBODIMENTS

Figure 1:
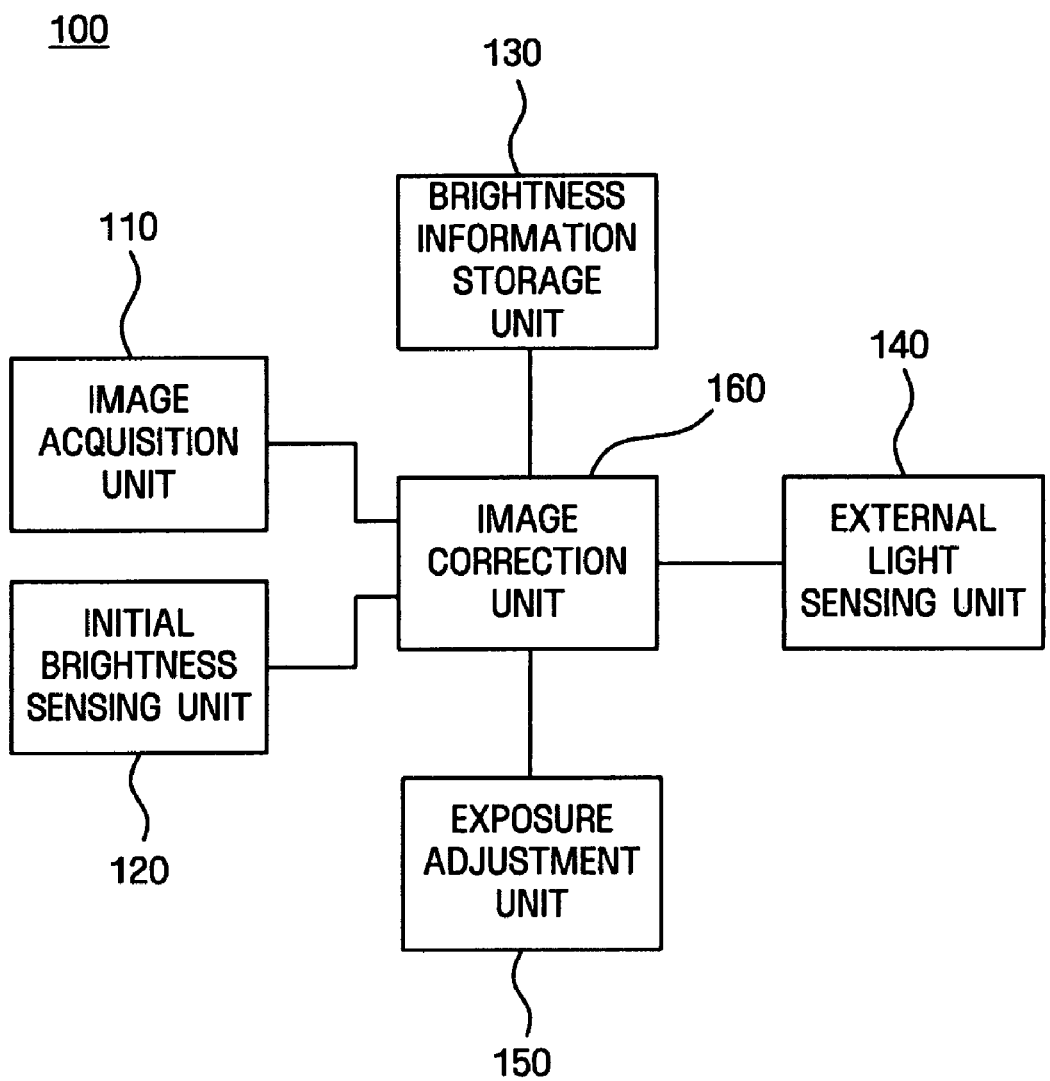
FIG. 1 illustrates a system correcting brightness of an image, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a system 100 correcting brightness of an image, according to an embodiment of the present invention.

Referring to FIG. 1, the system 100 may include, for example, an image acquisition unit 110, an initial brightness sensing unit 120, a brightness information storage unit 130, an external light sensing unit 140, an exposure adjustment unit 150, and an image correction unit 160.

The image acquisition unit 110 may acquire an image of a subject during a predetermined exposure time. The initial brightness sensing unit 120 may sense the brightness of the acquired image during initial exposure. Here, the brightness of the acquired image during the initial exposure may be considered to be an average brightness of the image. However, embodiments of the present invention are not limited thereto.

The brightness information storage unit 130 may store information regarding the brightness of the image, acquired by the image acquisition unit 110, according to an exposure time, for example. The brightness information of the acquired image may thus be classified according to the brightness of external light, e.g., the brightness of the environment in which the camera is located, and stored accordingly. In other words, in an embodiment, the brightness information of the acquired image stored in the brightness information storage unit 130 may be classified according to the brightness—for example, high illuminance, intermediate illuminance, and low illuminance—of the external light and stored accordingly.

Figure 2:
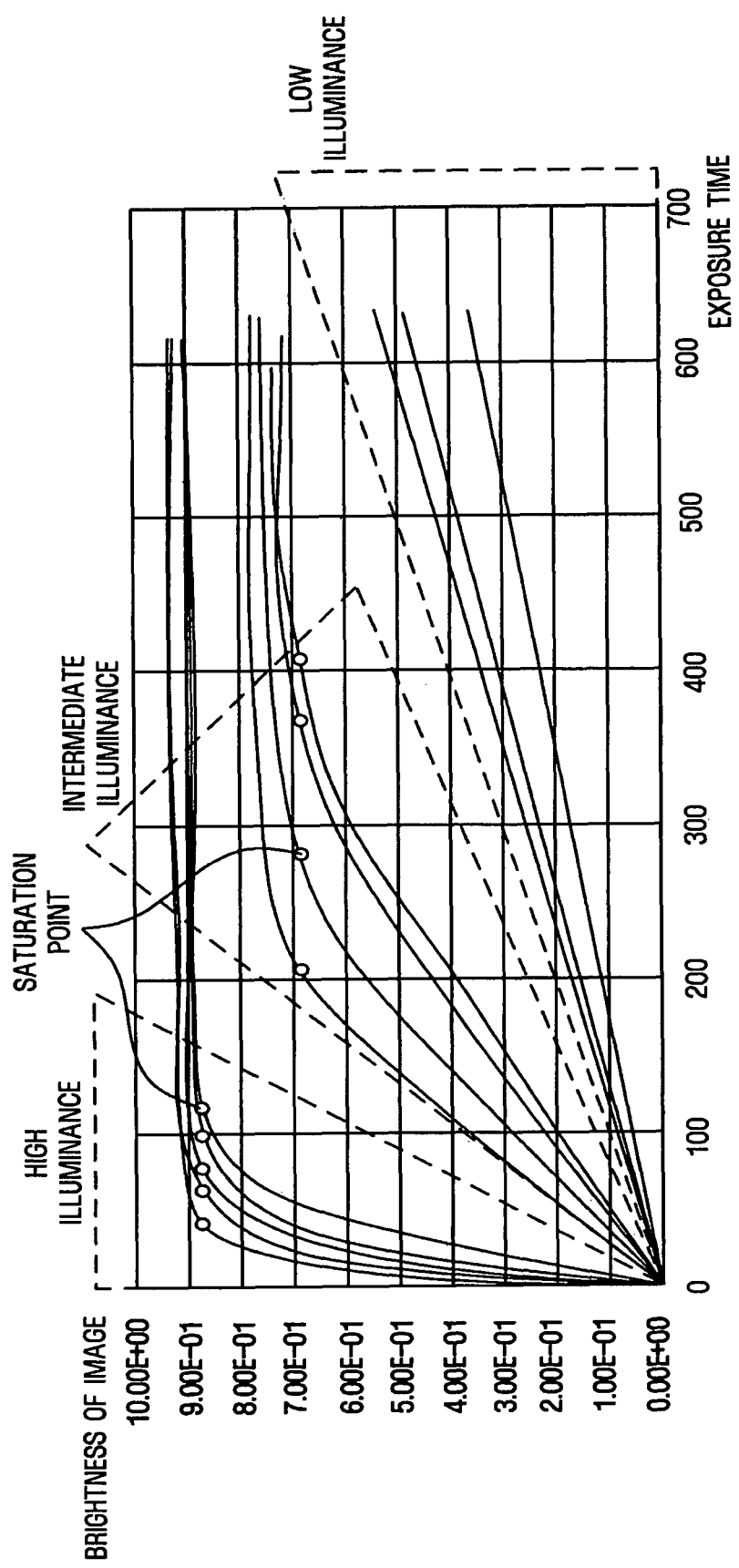
FIG. 2 illustrates brightness of an image according to an exposure time under different brightness of external light, according to an embodiment of the present invention.
Figure 3:
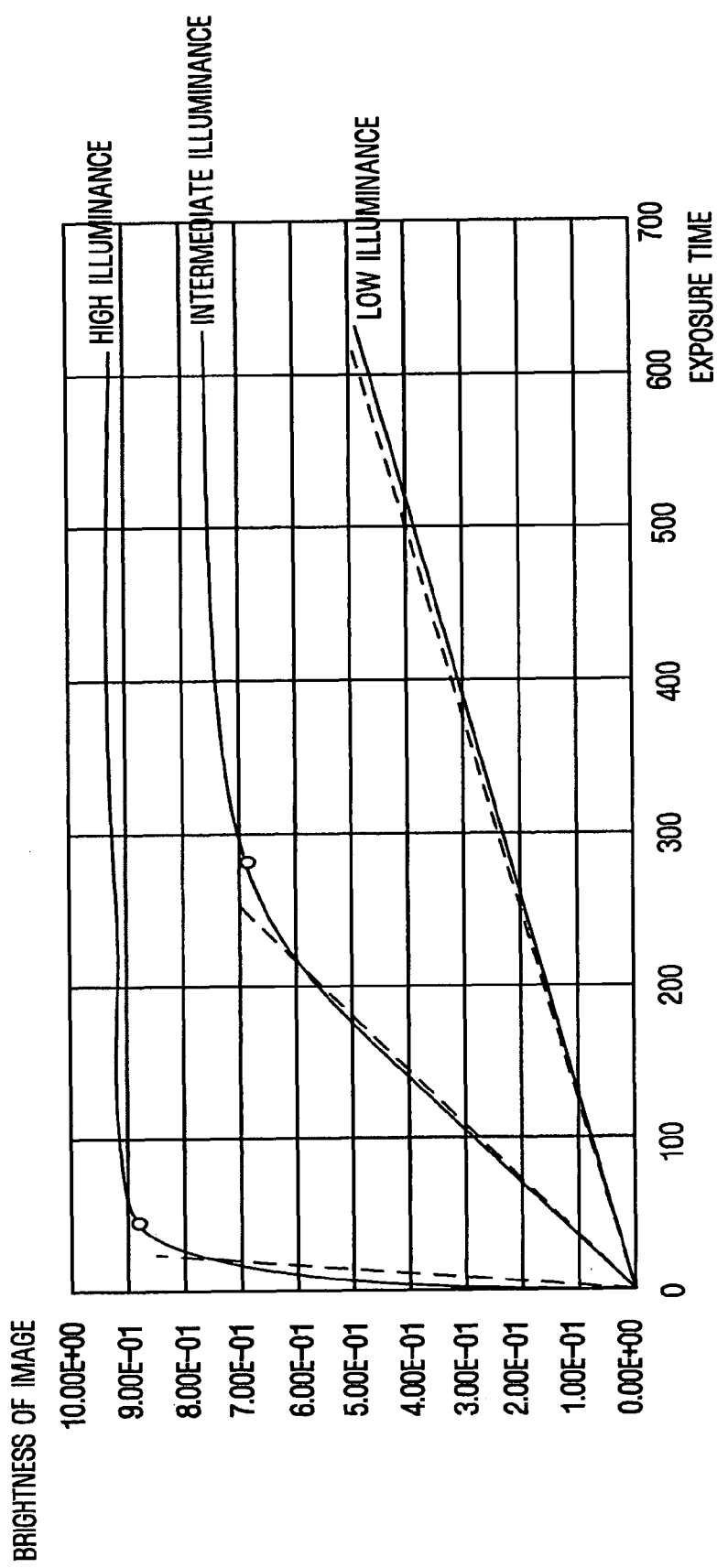
FIG. 3 illustrates brightness information, according to an embodiment of the present invention.

FIG. 2 illustrates the brightness of an image according to an exposure time under different external light, according to an embodiment of the present invention. FIG. 3 illustrates brightness information stored in the brightness information storage unit 130, according to an embodiment of the present invention.

Referring to FIG. 2, a saturation point, at which the brightness of an acquired image according to an exposure time no longer increases, is different when the brightness of the external light corresponds to one of high illuminance, intermediate illuminance, or low illuminance, for example.

According to this example, the brightness information stored in the brightness information storage unit 130 will now be described with reference to FIG. 3. Referring to FIG. 3, an axis of the graph may indicate the brightness of the image acquired by the image acquisition unit 110 according to the exposure time. If the exposure time increases according to the brightness of the external light, each brightness information may be non-linear up to a saturation point. In ideal cases, in an embodiment the brightness information may be linear up to the saturation point. The non-linear form of the brightness information may be caused by an external environment such as noise. Hence, if a high-performance sensor is used, the brightness information may become close to the linear form.

Here, such an embodiment, it may be understood that each brightness information, according to the brightness of the external light, may be linear up to the saturation point as indicated by dotted lines in FIG. 3.

The external light sensing unit 140 may sense the brightness of the external light in order to determine which of the brightness information stored in the brightness information storage unit 130 should be used to correct the brightness of the image acquired by the image acquisition unit 110. Accordingly, the image correction unit 160, which will be described in greater detail below, may select appropriate brightness information based on the brightness of the external light sensed by the external light sensing unit 140, e.g., according to whether the brightness of the external light corresponds to high, intermediate, or low illuminance.

If the exposure time is adjusted in order to correct the initial brightness sensed by the initial brightness sensing unit 120 toward the target brightness, the exposure adjustment unit 150 may adjust exposure based on the adjusted exposure time. The exposure adjustment unit 150 may be controlled by the image correction unit 160, for example.

The image correction unit 160 may correct the brightness of the image, e.g., acquired by the image acquisition unit 110. Specifically, the image correction unit 160 may select brightness information corresponding to the brightness of the external light sensed by the external light sensing unit 140, for example, from the brightness information stored in the brightness information storage unit 130, and correct the brightness of the acquired image.

More specifically, in this example, if the brightness of the external light sensed by the external light sensing unit 140 corresponds to a high illuminance, the image correction unit 160 may extract brightness information corresponding to such a high illuminance from the brightness information stored in the brightness information storage unit 130. In this case, the extracted brightness information may be linear up to the saturation point, for example. Then, the image correction unit 160 may determine an exposure time required to make the initial brightness become the target brightness based on the extracted brightness information, control the exposure adjustment unit 150 according to the determined exposure time, and correct the brightness of the image acquired by the image acquisition unit 110 toward the target brightness.

Figure 4:
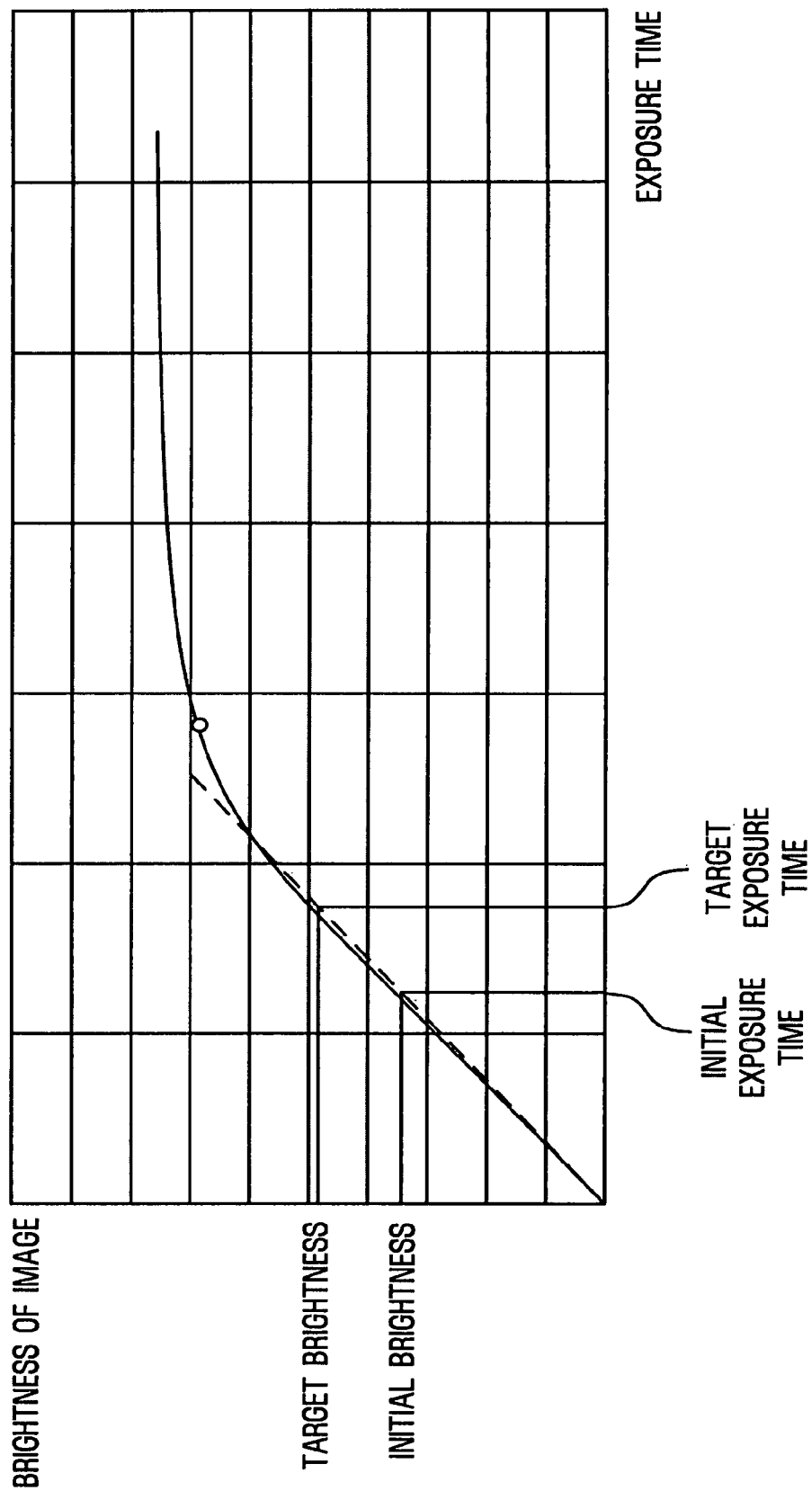
FIG. 4 illustrates an initial exposure time and a target exposure time respectively corresponding to initial brightness and target brightness, according to an embodiment of the present invention.

For example, referring to FIG. 4, the image correction unit 160 may determine the initial brightness during an initial exposure time through the initial brightness sensing unit 120. In addition, the image correction unit 160 may extract brightness information corresponding to the brightness of external light from the brightness information stored in the brightness information storage unit 130 and determine a target exposure time required to correct the initial brightness toward the target brightness based on the extracted brightness information. In addition, the image correction unit 160 may control the exposure time by controlling the exposure adjustment unit 150 according to the determined target exposure time.

In other words, a slope of the brightness of the image with respect to the exposure time may be determined by initial brightness/initial exposure time, and the brightness of the image may be determined by slope×exposure time. Therefore, the target exposure time may be calculated as target brightness/slope.

Figure 5:
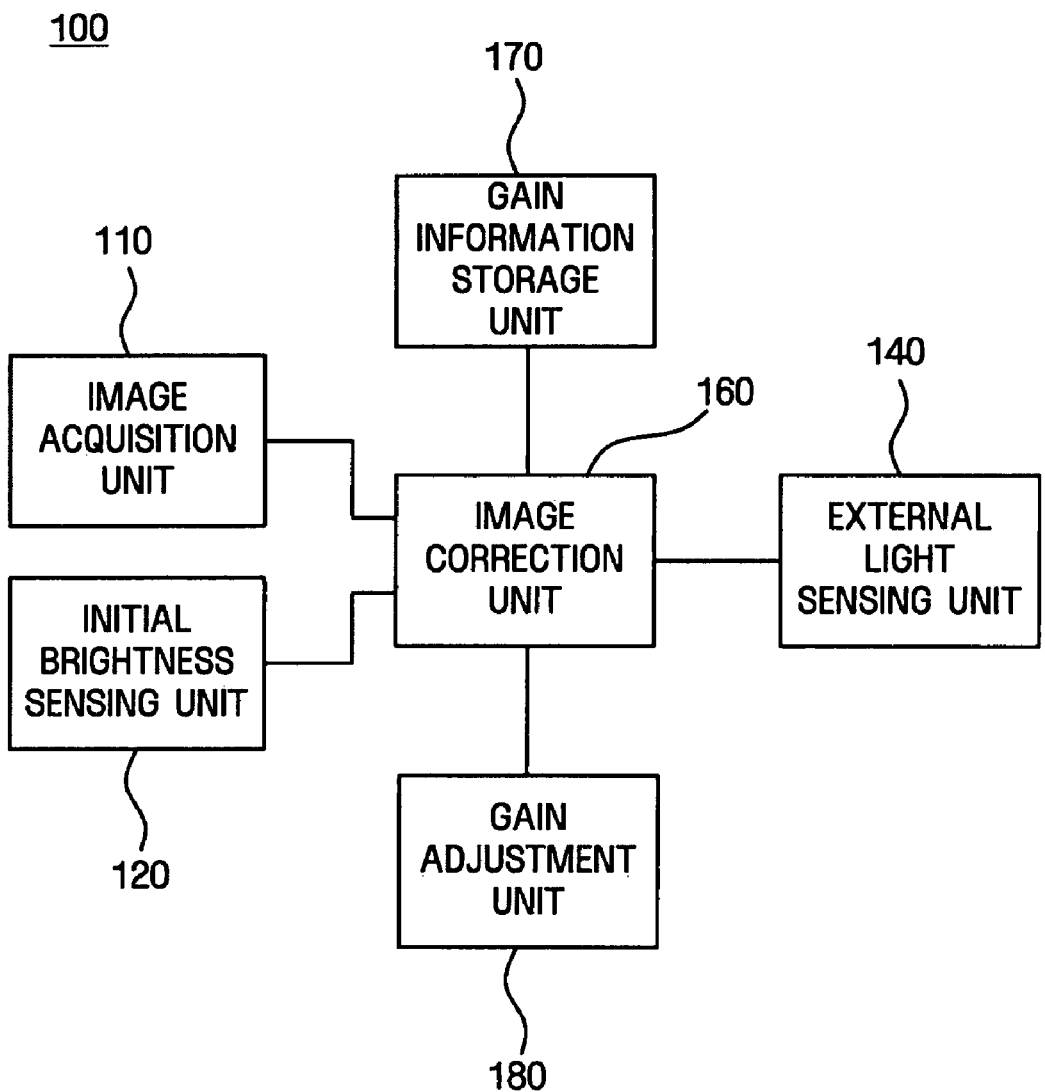
FIG. 5 illustrates a system correcting brightness of an image, according to an embodiment of the present invention.

FIG. 5 illustrates a system 100 correcting brightness of an image, according to an embodiment of the present invention.

Referring to FIG. 5, the system 100 may include, for example, an image acquisition unit 110, an initial brightness sensing unit 120, a gain information storage unit 170, a gain adjustment unit 180, an external light sensing unit 140, and an image correction unit 160.

In contrast to the system 100 illustrated in FIG. 1, the system 100 illustrated in FIG. 5 may correct brightness of an acquired image by adjusting gain, rather than exposure time, for example, noting that alternative embodiments are also available. Here, like reference numerals in FIGS. 1 and 5 denote elements that may perform similar operations, and thus a more detailed description will be omitted.

Thus, in this example, gain information storage unit 170 may store gain information indicating brightness of an image according to gain. In an embodiment, different gain information may be stored in the gain information storage unit 230, for example, according to brightness of external light sensed by the external light sensing unit 140.

Figure 6:
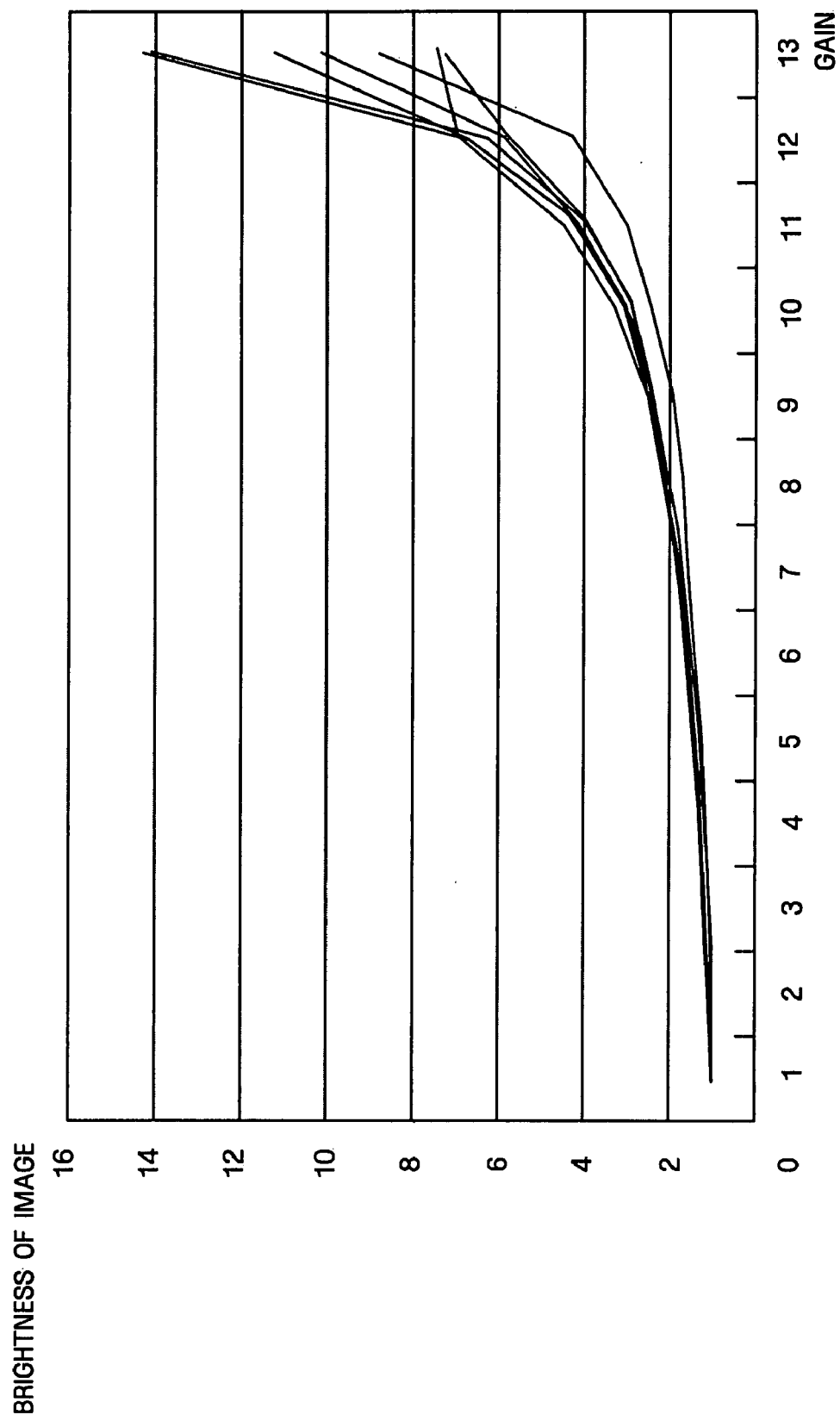
FIG. 6 illustrates a gain according to different brightness of external light, according to an embodiment of the present invention.

FIG. 6 illustrates gain information, according to an embodiment of the present invention.

Referring to FIG. 6, the gain information may represent a different brightness of an image under the same gain, according to brightness of external light. In addition, the form of the gain information according to each brightness state of the external light may be, on the whole, similar. Therefore, although a case where different gain information is stored according to the brightness of the external light has been described in an embodiment, embodiments of the present invention are not limited thereto. The same gain information may be used for different brightness of the external light. To this end, an average of the gain information according to each brightness state of the external light may be used.

When the image correction unit 160 corrects the brightness of the image by adjusting a gain, the external light sensing unit 140 may be used to select appropriate gain information, for example, from the gain information stored in the gain information storage unit 230. In an embodiment, if the same gain information is used as described above, the external light sensing unit 140 may be omitted.

Thus, in an embodiment, the image correction unit 160 may correct brightness of an image acquired by the image acquisition unit 110 by controlling the gain adjustment unit 180 to adjust a gain of the acquired image with reference to gain information extracted from the gain information storage unit 230 so that the initial brightness of the acquired image may be corrected toward a target brightness.

Figure 7:
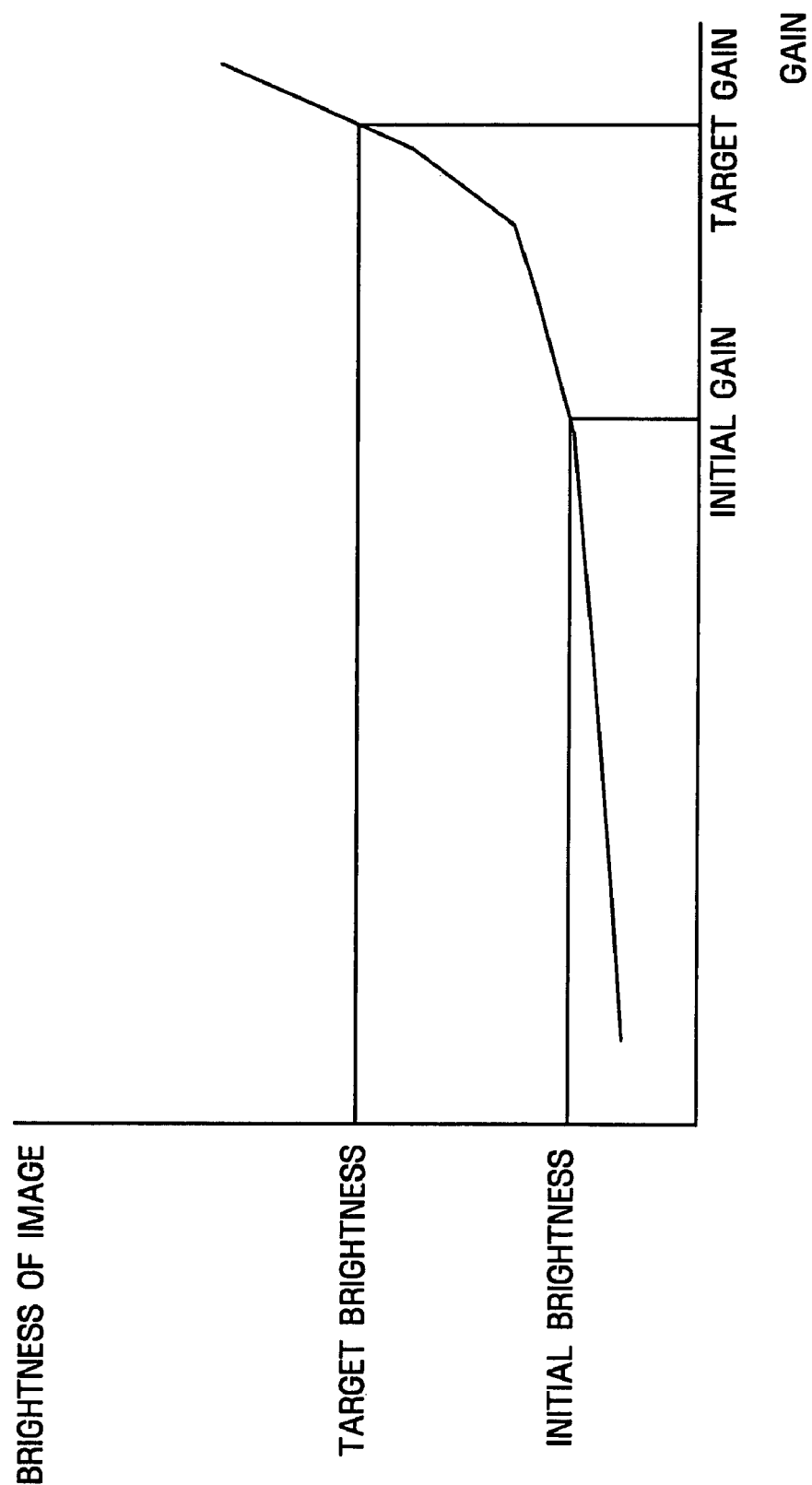
FIG. 7 illustrates an initial gain and a target gain respectively corresponding to initial brightness and target brightness, according to an embodiment of the present invention.

Specifically, if the same gain information is used regardless of the brightness of the external light, the image correction unit 160 may determine an initial gain sensed by the initial brightness sensing unit 120, as illustrated in FIG. 7, and determine a target gain corresponding to the target brightness based on the gain information extracted from the gain information storage unit 170. Therefore, the image correction unit 160 may control the gain adjustment unit 180 according to the determined target gain and thus correct the brightness of the acquired image.

FIG. 8 illustrates a method of correcting brightness of an image, according to an embodiment of the present invention.

Referring to FIG. 8, an image may be acquired, in operation S110, e.g., by the image acquisition unit 110, such as in FIG. 1. The initial brightness of the acquired image may be sensed during an initial exposure time in operation S120, e.g., by the initial brightness sensing unit 120.

Then, in operation S130, brightness information corresponding to brightness of external light may be extracted, e.g., by the image correction unit 160, from brightness information stored, e.g., in the brightness information storage unit 130. The brightness of the external light may be sensed, for example, by the external light sensing unit S140. In other words, in an example, if the brightness of the external light is classified into high illuminance, intermediate illuminance, and low illuminance, brightness information corresponding to the brightness of the external light may be extracted, e.g., by the image correction unit 160, from the brightness information stored in the brightness information storage unit 130. Here, such a case where the brightness of the external light is classified into high illuminance, intermediate illuminance and low illuminance has been described as only an example, used to help promote the understanding of one or more embodiments of the present invention such that the present invention is not limited thereto. In an embodiment, the brightness of the external light may be classified into broader or narrower categories.

A target exposure time may be determined by the image correction unit 160 using the target exposure time corresponding to target brightness based on the extracted brightness information, in operation S140. In operation S150, the exposure time may be adjusted, according to the determined target exposure time, e.g., by using the image correction unit 160 to control the exposure adjustment unit 150.

As exposure time is adjusted to the target exposure time, e.g., by the exposure adjustment unit 150, the brightness of the image acquired by the image acquisition unit 110 may be corrected.

FIG. 9 illustrates a method of correcting brightness of an image according to an embodiment of the present invention.

Referring to FIG. 9, an image may be acquired in operation S210, e.g., by the image acquisition unit 110, such as in FIG. 5. The initial brightness of the acquired image may be sensed during an initial gain, in operation S220, e.g., by the initial brightness sensing unit 120.

Then, in operation S230, gain information corresponding to brightness of external light may be extracted, e.g., by the image correction unit 160, from gain information stored, e.g., in the gain information storage unit 130. The brightness of the external light may be sensed, for example, by the external light sensing unit 140. In other words in an example, if the brightness of the external light is classified into high illuminance, intermediate illuminance, and low illuminance, gain information corresponding to the brightness of the external light may be extracted, e.g., by the image correction unit 160, from the brightness information stored in the gain information storage unit 130. Here, such a case where the brightness of the external light is classified into high illuminance, intermediate illuminance and low illuminance has been described as an example, used to help promote the understanding of the present invention, such that the present invention is not limited thereto. In an embodiment, the brightness of the external light may be classified into broader or narrower categories, for example.

In addition, although the case where the same gain information is used for all brightness states of the external light due to similarity among gain information corresponding to the brightness of the external light may have been described as an example, embodiments of the present invention are not limited thereto.

In operation S240, a target gain corresponding to target brightness may be determined based on the extracted gain information, e.g., by the image correction unit 160. In operation S250, the gain may be adjusted, e.g., by the image correction unit 160, according to the determined target gain, e.g., by controlling the gain adjustment unit 180.

As the gain may be adjusted to the target gain, e.g., by the gain adjustment unit 180, the brightness of the image acquired, e.g., by the image acquisition unit 110, may thus be corrected.

A system, method and medium correcting brightness of an image according to one or more embodiments of the present invention may have been described with reference to block diagrams or flowchart illustrations. It will be understood that each block of the flowchart illustrations, and combinations of blocks in the flowchart illustrations, may also be implemented with computer program instructions. These computer program instructions may be provided to a processor of a general purpose computer, special purpose computer, or other programmable data processing apparatus, such that the instructions, which execute via the processor of the computer or other programmable data processing apparatus, implement the operations specified in the flowchart block or blocks.

The computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the operation specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus implement the operations specified in the flowchart block or blocks.

In addition, each block of the flowchart illustrations may represent a module, segment, or portion of code, which comprises one or more executable instructions for implementing the specified logical operation(s). It should also be noted that in some alternative implementations, the operations noted in the blocks may occur out of the order. For example, two blocks shown in succession may in fact be executed substantially concurrently or the blocks may sometimes be executed in the reverse order, depending upon the operations involved.

Further, the term 'unit', as used herein, may mean, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Thus, with this in mind and in addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), for example. The media may also be a distributed network, so that the computer readable code is stored and executed in a distributed fashion. Still further, as only an example, the processing element could include a processor or a computer processor, and processing elements may be distributed and/or included in a single device.

As described above, according to a system, method and medium correcting brightness of an image according to one or more embodiments of the present invention, a repetitive feedback using at least one of brightness information and gain information may not be needed. Therefore, the time and the amount of computation required to correct brightness of an image can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system correcting brightness of an image captured by an image acquisition unit, the system comprising:
    an initial brightness sensing unit to sense an initial brightness of the captured image from an initial exposure;
    an external light sensing unit, separate from the image acquisition unit, to sense brightness information of an external light, wherein the brightness information of the external light is a brightness of an environment in which the system is located;
    a brightness information storage unit to store the initial brightness information of the captured image classified according to a plurality of brightness environments; and
    an image correction unit to correct the brightness of the sensed initial image toward a target brightness using a stored brightness environment, corresponding to the sensed brightness of the external light, of the plurality of stored brightness environments.

2. The system of claim 1, further comprising an image acquisition unit to capture the image.

3. The system of claim 2, further comprising:
    a brightness information storage unit to store brightness information that indicates the brightness of the image according to an exposure time; and
    an exposure adjustment unit to adjust the exposure time.

4. The system of claim 3, wherein the brightness information is classified as one of a plurality of brightness environments, based on the sensed brightness environment, and stored accordingly, and the brightness of the image linearly increases to a point, at which the brightness of the image is saturated, as the exposure time increases.

5. The system of claim 4, wherein the image correction unit extracts brightness information, corresponding to the sensed brightness environment, from the brightness information storage unit and controls the exposure adjustment unit to adjust the exposure time based on the extracted brightness information so that the initial brightness of the image can be corrected toward the target brightness.

6. The system of claim 1, further comprising:
    a gain information storage unit to store gain information that indicates the brightness of the image according to a gain; and
    a gain adjustment unit to adjust the gain.

7. The system of claim 6, wherein the image correction unit extracts gain information, corresponding to the sensed brightness environment, from the gain information storage unit and controls the gain adjustment unit to adjust the gain based on the extracted gain information so that the initial brightness of the image can be corrected toward the target brightness.

8. A method correcting brightness of an image of a subject captured by an image acquisition unit, the method comprising:
- sensing an initial brightness of the captured image from an initial exposure;
- sensing brightness information of an external light, using a unit separate from the image acquisition unit, wherein the brightness information of the external light is a brightness of an environment in which the system is located;
- storing the initial brightness information of the captured image classified according to a plurality of brightness environments; and
- correcting the brightness of the sensed initial image toward a target brightness using a stored brightness environment corresponding to the sensed brightness of the external light of the plurality of stored brightness environments.

9. The method of claim 8, further comprising capturing the image.

10. The method of claim 9, further comprising:
storing brightness information that indicates the brightness of the image according to an exposure time; and
adjusting the exposure time.

11. The method of claim 10, wherein the brightness information is classified as one of a plurality of brightness environments, based on the sensed brightness environment, and stored accordingly, and the brightness of the image linearly increases to a point, at which the brightness of the image is saturated, as the exposure time increases.

12. The method of claim 11, wherein the correcting of the brightness of the image comprises:
extracting brightness information corresponding to the sensed brightness environment; and
adjusting the exposure time based on the extracted brightness information so that the initial brightness of the image can be corrected toward the target brightness.

13. The method of claim 8, further comprising:
storing gain information that indicates the brightness of the image according to a gain; and
adjusting the gain.

14. The method of claim 13, wherein the correcting of the brightness of the acquired image comprises:
extracting gain information corresponding to the sensed brightness environment; and
adjusting the gain based on the extracted gain information so that the initial brightness of the image can be corrected toward the target brightness.

15. At least one medium comprising computer readable code to control at least one processing element to implement the method of claim 8.

* * * * *

UNITED STATES PATENT AND TRADEMARK OFFICE
CERTIFICATE OF CORRECTION

| | | |
|---|---|---|
| PATENT NO. | : 8,023,015 B2 | Page 1 of 1 |
| APPLICATION NO. | : 11/898494 | |
| DATED | : September 20, 2011 | |
| INVENTOR(S) | : Chung et al. | |

It is certified that error appears in the above-identified patent and that said Letters Patent is hereby corrected as shown below:

Column 10, Line 23, In Claim 15, delete "medium comprising computer readable" and insert -- non-transitory computer readable medium comprising --, therefor.

Signed and Sealed this
Thirty-first Day of January, 2012

David J. Kappos
*Director of the United States Patent and Trademark Office*